Oct. 21, 1958

I. E. OTTO 2,857,020

LUBRICATING DEVICE

Filed Aug. 1, 1956

INVENTOR.

Isa E. Otto

# United States Patent Office 2,857,020
Patented Oct. 21, 1958

2,857,020

LUBRICATING DEVICE

Isa E. Otto, Castro Valley, Calif.

Application August 1, 1956, Serial No. 601,512

1 Claim. (Cl. 184—45)

This invention relates to lubricating devices.

It is an object of the present invention to provide a lubricating device which will supply a constant, steady flow of lubricant to the desired point over a relatively long period of time.

It is another object of the present invention to provide a lubricating device of the above type which can be used with any type of lubricant that will flow similarly to grease and oil and which relieves the necessity of regular and frequent shut down of machinery for lubrication.

Other objects of the invention are to provide a lubricating device bearing the above objects in mind which is of simple construction, has a minimum number of parts, is inexpensive to manufacture and efficient in operation.

Figure 1:
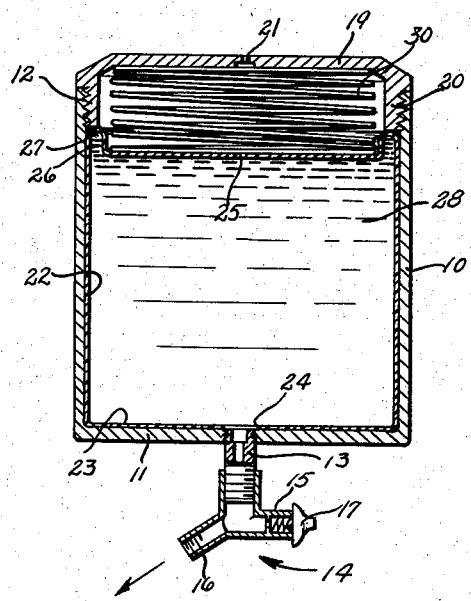
Figure 2:
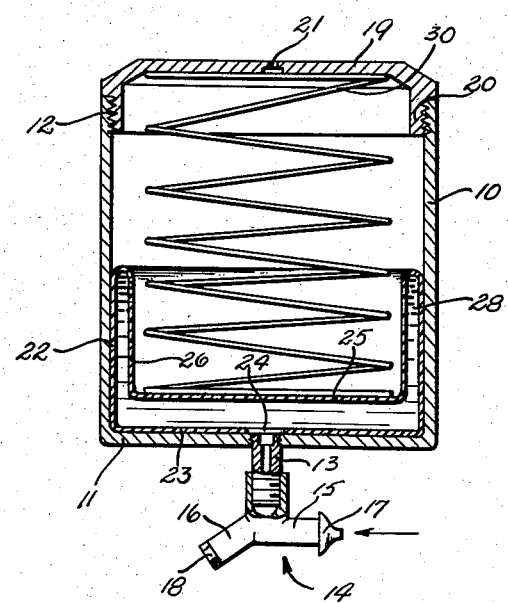

For other objects and for a better understanding of the invention, reference may be had to the following detailed description taken in connection with the accompanying drawing, in which:

Figure 1 is a vertical sectional view of a preferred embodiment of the present invention showing the same after it has just been filled; and Fig. 2 is a view similar to Fig. 1 but showing the device after it has been emptied.

Referring now more in detail to the drawing, 10 represents a hollow cylindrical body or casing having the circular bottom wall 11, the upper end of the casing 10 being internally threaded, as at 12, substantially as illustrated.

The bottom wall 11 at the center thereof is provided with the fitting or outlet 13, preferably the upper end of the fitting 13 being externally threaded and screwed into an internally threaded opening provided in the bottom wall 11. The lower end of the fitting 13 is externally threaded and has screwed thereon a fitting assembly indicated generally at 14 having the inlet 15 and the outlet 16, the inlet 15 having the usual one way valve 17 while the outlet 16 is provided with the removable plug 18 adapted to be screwed therein. By means of the fitting 14, the body 10 may be filled with lubricant under pressure through the one way valve 17 and then permitting the dispensing from the body 10 through the outlet 16 upon removal of the plug 18, as will be obvious.

In the practice of my invention, the upper end of the body 10 has screwed therein the cap 19 having the depending externally threaded skirt 20, the cap 19 having an air vent 21.

A hollow cylindrical, flexible, impervious, collapsible reservoir 22 is positioned within the casing 10 having a bottom wall 23 integral therewith which rests on the bottom wall of the casing and being provided with the central opening 24 which communicates with the fitting 13. The reservoir 22 is also integrally formed with the reduced, depressed circular top wall 25 integrally formed around its periphery with the upwardly extending skirt 26 which is connected to the upper end of the reservoir 22 by means of the U-shaped portion 27. The reservoir 22 will assume the position of Fig. 1 when the interior thereof is completely filled with the lubricant 28 supplied through the fitting 14 through the inlet 15 thereof.

A coil spring 30 is positioned within the assembly with the upper end thereof abutting the cap 19 and the lower end thereof resting on the top wall 25 of the reservoir within the skirt 26, the spring 30 normally being compressed during the filling, Fig. 1, but expandible as shown in Fig. 2 to dispense the lubricant through the outlet 16 continuously and over a long period of time.

In operation, the reservoir is filled (Fig. 1) through the fitting 14 to compress the spring 30, and the lubricant is dispensed to the desired point through the outlet 16 under the action of the expanding spring 30 over a long period of time.

It will be noted that with this lubricating device machinery will not have to be stopped with an attendant economy of labor. The size, capacity, type, pressure of each lubricator to be used is determined by the demands imposed from an engineering standpoint to allow full utilization of this type of automtaic lubricator.

In motor vehicles, farm equipment, military and naval equipment, conveyors or the like the periods between lubrication stops can be extended months and even years. Not to be overlooked is the important matter of the life of the bearings, bushings, joints or the like which will be prolonged appreciably because of full, steady and constant lubrication. It will be noted that the top wall 25 of the reservoir is free floating and is not a piston or plunger, as commonly accepted, being an integral part of the reservoir. The heart of the invention, the reservoir, is of non-porous, impervious, flexible and collapsible material and is sealed air-tight and leak-proof. The body 10 provides several important functions and is also an important part of the lubricator. It functions as a container, as a cylinder, and it protects the entire unit from possible damage. The cover 19 provides for air venting, and maintains the spring 30 in position. It should be apparent that this automatic lubricating device will function effectively without any seepage of the type inherent in all previously patented lubricators of a similar nature and purpose.

The fitting 13 is used in conjunction with an Alemite or zerk type grease fitting 14.

When the spring 30 has reached the maximum expansion, the refilling cycle must be repeated in order to maintain the flow of lubricant as desired.

While various changes may be made in the detail construction, it shall be understood that such changes shall be within the spirit and scope of the present invention as defined by the appended claim.

What I claim as new and desire to protect by Letters Patent of the United States is:

A lubricating device comprising a hollow casing having a flat bottom wall, closure means at the upper end of said casing having a centrally located vent opening, a centrally located outlet in said casing bottom wall, grease fitting means connected to said outlet and having an inlet including a one way valve adapted to be connected to a supply of lubricant under pressure for filling said casing and an outlet for ejecting said lubricant from said casing after being filled, a hollow closed collapsible reservoir tightly secured within said casing having a bottom wall resting upon said casing bottom wall, said bottom wall of said collapsible reservoir having an opening communicating with said outlet for permitting the passage of fluid between said reservoir and said outlet, said reservoir having a top wall of uniformly smaller size than said reservoir bottom wall, an upwardly extending peripheral skirt connected to the upper end of said reservoir, and a coil spring having its upper end abutting said closure means and a lower end abutting said reservoir top wall within said upwardly extending skirt for urging said reservoir top wall downwardly so as to subject the lubricant contained within said reservoir to pressure, whereby said lubricant is ejected outwardly through said opening in said bottom wall of said reservoir and through said outlets continuously and over a long period of time.

References Cited in the file of this patent

UNITED STATES PATENTS

| | | |
|---|---|---|
| 1,891,544 | Kerns | Dec. 20, 1932 |
| 2,474,512 | Bechtold | June 28, 1949 |
| 2,532,143 | Breit | Nov. 28, 1950 |
| 2,593,972 | Bray | Apr. 22, 1952 |